US007903790B2

(12) United States Patent
Hart et al.

(10) Patent No.: US 7,903,790 B2
(45) Date of Patent: *Mar. 8, 2011

(54) SYSTEM AND METHOD FOR COMPLETING INCOMPLETE RECORDS IN A DATABASE OF TWISTED CABLE PAIR INFORMATION

(75) Inventors: Richard Dennis Hart, Concord, CA (US); David Lewis Kimble, Danville, CA (US); Laxman Sahasrabuddhe, San Ramon, CA (US); Raghvendra G. Savoor, Walnut Creek, CA (US); Frederick Michael Armanino, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1269 days.

This patent is subject to a terminal disclaimer.

(21) Appl. No.: 11/424,100

(22) Filed: Jun. 14, 2006

(65) Prior Publication Data

US 2006/0222167 A1 Oct. 5, 2006

Related U.S. Application Data

(63) Continuation of application No. 10/382,182, filed on Mar. 5, 2003, now Pat. No. 7,079,626.

(51) Int. Cl.
*H04M 1/24* (2006.01)
*H04M 3/08* (2006.01)
*H04M 3/22* (2006.01)

(52) U.S. Cl. .................. 379/1.04; 379/15.03; 379/22.04; 379/27.01

(58) Field of Classification Search ............. 379/265.13, 379/1.01, 15.03, 22.04, 27.01, 29.01, 1.04, 379/1.03, 22.01, 22.02, 22.03, 22.07, 22.08, 379/24, 27.02, 27.03, 28, 29.09, 30, 31, 32.04; 370/395.41

See application file for complete search history.

(56) References Cited

U.S. PATENT DOCUMENTS

| | | | |
|---|---|---|---|
| 6,091,713 A | 7/2000 | Lechleider et al. | 370/248 |
| 6,209,108 B1 | 3/2001 | Pett et al. | 714/43 |
| 6,266,395 B1 | 7/2001 | Liu et al. | 379/27 |
| 6,292,539 B1 | 9/2001 | Eichen et al. | 379/1.04 |
| 6,370,547 B1 | 4/2002 | Eftink | 707/201 |
| 6,388,592 B1 | 5/2002 | Natarajan | 341/107 |
| 6,434,147 B1 | 8/2002 | Brown et al. | 370/394 |
| 6,442,562 B1 | 8/2002 | Carey et al. | 707/102 |
| 6,454,168 B1 | 9/2002 | Brandt et al. | 235/462.12 |
| 6,454,729 B1 | 9/2002 | Jacobs et al. | 600/587 |
| 6,463,126 B1 | 10/2002 | Manica et al. | 379/27.01 |
| 6,819,746 B1 * | 11/2004 | Schneider et al. | 379/29.01 |
| 6,870,899 B2 | 3/2005 | Hartsfield et al. | 379/1.04 |
| 7,391,780 B1 * | 6/2008 | Stone et al. | 370/395.41 |
| 2002/0122552 A1 | 9/2002 | Liu | 379/399.01 |

* cited by examiner

*Primary Examiner* — Thjuan K Addy
(74) *Attorney, Agent, or Firm* — Jackson Walker L.L.P.

(57) ABSTRACT

A system and method for imputing data into a database includes an imputing system operable to impute data based on outside plant construction principles. The imputing system includes an inventory database, a data engine, a search engine, and a loop engine. The inventory database includes a plurality of distribution records each associated with one or more cable pairs. The data engine determines if a desired distribution record corresponding to a desired cable pair includes missing data. The search engine searches a known class of serving terminals for complete distribution records and iteratively searches a sized binder group within the inventory database for one or more complete distribution records where the size of the binder group searched increases with each iterative search. The loop engine determines an imputed value for the desired distribution record based on the searching and imputes the value into the desired distribution record.

20 Claims, 4 Drawing Sheets

SYSTEM AND METHOD FOR COMPLETING INCOMPLETE RECORDS IN A DATABASE OF TWISTED CABLE PAIR INFORMATION

RELATED APPLICATION

This application is a continuation of U.S. patent application Ser. No. 10/382,182 filed Mar. 5, 2003 now U.S. Pat. No. 7,079,626, the content of which is hereby incorporated in its entirety by reference.

TECHNICAL FIELD OF THE INVENTION

The present invention relates generally to information processing, and more specifically relates to a system and method for imputing data into a database.

BACKGROUND OF THE INVENTION

In a telephone network, a telephone loop is the wired connection from a telephone company's central office in a city to the residences and businesses of the customers. The central office includes switching equipment that switches telephone calls locally or to long-distance carrier telephone offices. Typically each city has its own telephone central office and each central office includes one or more wire centers where the number of wire centers depends on the number of customers or subscribers in the city. The telephone loop consists of one or more segments of twisted pair copper wires spliced together and was originally designed for voice transmissions on a single voice channel.

DSL Internet services allow residential and business customers to receive broadband Internet services over the telephone loop of the telephone network. But in order to receive DSL services, the residences and businesses must be within a certain distance of the telephone company's central office, and the twisted pair of copper wire must be of a particular gauge. Therefore the telephone companies must keep accurate records regarding wire gauge and the distances from the central office to residences and businesses, so that when a customer requests DSL service, the telephone company will be able to quickly determine if the customer is within the required distance and therefore eligible to receive DSL service.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the present invention are illustrated in the figures, like numerals being used to refer to like and corresponding parts of the various drawings.

The telephone copper loop network consisting of twisted pair copper wire has evolved from providing only voice to providing digital services such as Digital Subscriber Line ("DSL") services. Telephone companies keep and maintain numerous databases that store various information regarding the telephone loop. One such database is the Loop Facility Assignment System ("LFACS") database which contains elements that are used to form the basic access method to the telephone network. The LFACS database includes information regarding the layout of the telephone loop and characteristics of the telephone loop such as lengths of cable runs and the gauge of the cable.

As more home and business users request and require broadband Internet access such as DSL over the telephone loop, the telephone companies and service provider companies that provide DSL services need a way to quickly scan the various databases such as LFACS and extract information in order to qualify customers for DSL. Unlike POTS ("Plain Old Telephone Service") where any loop engineered to resistance design rules can be used to provide voice services to customers, DSL requires knowledge about the lengths and gauges of the wire that makes up the loop. Incomplete information in the LFACS database creates lost revenue for the telephone companies and service provider companies due to the loss of qualified customers who cannot be qualified due to missing data. Furthermore, inaccurate information on telephone loop makeup involves additional revenue loss in attempting to provide DSL service to customers over a loop which does not qualify for DSL.

The telephone loop is the basic copper wire pair that connects a subscriber living unit (either a residence or a business) to a wire center located within a central office. Telephone loops are typically composed of two segments: a feeder segment and a distribution segment. The feeder segment comprises the majority of the length of the loop and runs from the wire center to a BBox while the distribution segment comprises the minority of the loop's overall length but can still exceed three or four thousand feet in length and travels from the BBox to one or more serving terminals. In order to provide basic telephone voice service, the POTS network does not require detailed knowledge of the distribution segment such as the length of the distribution segment and the gauge of the wire or cable in the distribution segment. Therefore, details regarding the distribution segment were not recorded by outside plant construction when the telephone loop was created and installed. Detailed information regarding the distribution segment was entered in the LFACS database only when special circuits required detailed loop information. Length and gauge information was rendered through examination of outside plant construction detail maps or electrical measurements such as taken with time-domain reflectometers or capacitative looplength instrumentation.

DSL, a mass-market service, requires detailed information regarding the distribution segment in order to determine if customers are eligible to receive DSL services. But many of the loops that may qualify for DSL service are missing information regarding the distribution segment in the LFACS database. Therefore when a customer calls requesting DSL and information for the distribution segment serving that customer is missing from the LFACS database, the company has two options: refuse to qualify the customer for DSL service due to the missing data or send a company technician to the customer site to determine if the customer is eligible for DSL and install DSL if the customer is eligible. Both of these options result in lost revenue for the company and dissatisfied customers. If the company refuses to qualify the customer, the customer may become dissatisfied with the company. Furthermore, if the customer is actually eligible for DSL, the company has lost out on a potential revenue source. If the company sends out a technician to determine DSL status and install DSL if eligible, the company wastes money on the technician visit if the customer is not eligible for DSL and the customer is unsatisfied with the company because the company told the customer he could get DSL and now the customer cannot get DSL.

In order to avoid the above problems, service providers and telephone companies have developed ways to estimate distribution segment data when it is missing from a company database. One such method is segregating the outside plant records by a digital area or tapercode. The tapercode is contained in the LFACS database and indicates a distribution area. Feeder segment and distribution segment cables are brought together for splicing to a location called a BBox, the BBox serving a tapercode. The telephone company uses the longest distribution cable found in the tapercode as the estimator for missing distribution segments. The problem with this approach is that a tapercode typically includes a wide variety of segment lengths, and selecting the longest of these cable lengths results in biasing the estimation towards longer lengths, which prevents customers who are eligible for DSL from qualifying, resulting in lost revenue to the telephone company and dissatisfied customers.

In addition, a mechanized loop test ("MLT") can be used to measure segments within the loop. The MLT performs a capacitive length measurement of the loop but, being a subsystem of the electronic switching system, it can measure only the lengths of loops of working telephone numbers. Therefore, MLT does not provide any useful data for new customers desiring to set up both a new telephone line and DSL service. Furthermore, telephone companies may estimate the length and gauge of the distribution segment by looking at street addresses and DSL service records and not by looking at the actual data in the LFACS database. The telephone companies assume that if a neighbor of a customer requesting DSL is eligible for DSL, then the customer must also be eligible. But this can lead to dissatisfied customers and money wasted on technician calls when the technician goes to install DSL and determines that the customer is not eligible.

By contrast, the example embodiment described herein allows for the estimation and imputing of missing data into a database utilizing outside plant construction principles. This results in consistent and more accurate imputed data. Because outside plant construction principles are utilized to impute the data, the resulting imputed data is more accurate and a better estimation of the actual data. Revenue is created because the imputed data is of greater accuracy allowing for more customers to be qualified for DSL service where before they would have been refused due to missing data. Time and money is saved because technician visits are required less often to determine DSL qualification status when there is missing data. In addition, customers experience a greater satisfaction level due to the ability to receive DSL service and not be denied DSL service when initially told that they are eligible.

Figure 1:
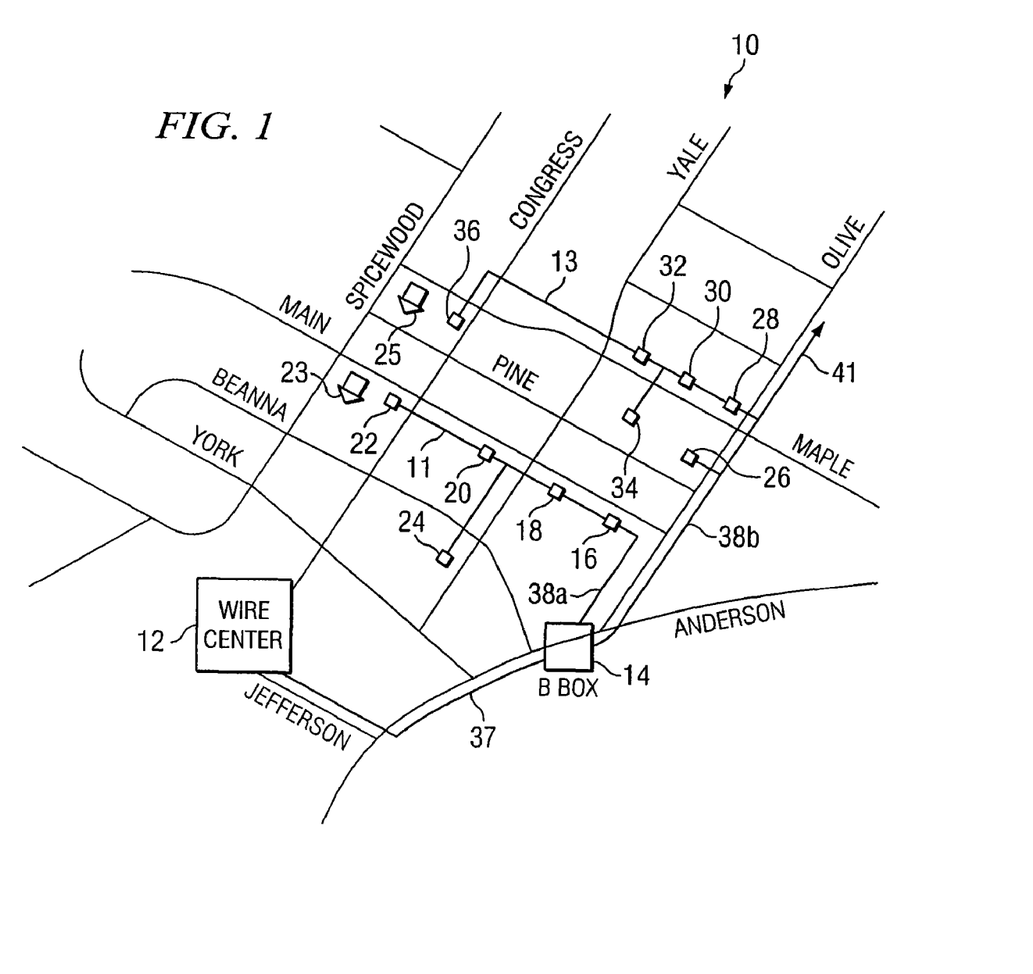
FIG. 1 depicts an example telephone loop.

Referring now to FIG. 1, an example telephone network 10 is shown imposed over a street map in a typical distribution area. Telephone network 10 includes loops 11 and 13, wire center 12, BBox 14, serving terminals 16, 18, 20, 22, 24, 26, 28, 30, 32, 34, and 36, feeder cable 37, and distribution cable 38. Although telephone network 10 is shown with one wire center, one BBox, two loops, eleven serving terminals, one feeder cable, and one distribution cable, in alternate embodiments telephone network 10 may include more than one wire center, more than one BBox, more or less than two loops, more or less than sixteen serving terminals, more than one feeder cable, and more than one distribution cable. Furthermore, wire center 12 may be disposed within a central office that includes more than one wire center.

When the telephone company constructs telephone network 10, the telephone company employs the outside plant construction practice of constructing the twisted pair telephone wire or cable in binder group pairs such as 5-pair, 25-pair, and 100-pair binder groups. When the telephony cable is manufactured, the pairs are counted off in groups of five and then wound with a marker, such as a plastic ribbon, which allows the outside plant personnel to handle the pairs as a unit. Five 5-pair binder groups are combined into a 25-pair binder group separated by wrapping with a ribbon. Likewise, four 25-pair binder groups are wrapped such that they form a 100-pair binder group. Furthermore, 100-pair binder groups may be wrapped together to further form any appropriate binder group size such as 200-pair, 300-pair, or 500-pair binder groups.

As the cable is laid out in telephone network 10, the cable pairs tend to remain grouped until there is a reason to separate them. For instance, an 800-pair distribution cable 38 may be laid along a busy thoroughfare starting at BBox 14, thereby creating loops 11 and 13. As cross streets containing residences or businesses are passed, one or more 25-pair binder groups will be separated from the main cable and laid down the cross streets. As the binder group travels along the street, serving terminals are built every few houses and some of the pairs in the 25-pair binder group are terminated at a serving terminal. For example, feeder cable 37 originates at wire center 12 and traverses along Jefferson and Anderson to cross connection terminal BBox 14. At BBox 14, feeder cable 37 is cross-connected to the distribution cable 38. From BBox 14, distribution cable 38 takes different directions with distribution cable 38a including 100-pair binder group pair numbers 0-99 traversing Olive to Main to form loop 11, and distribution cable 38b including 125-pair binder group pair numbers 100-224 traversing Olive to Maple to form loop 13. BBox 14 and distribution cable 38a including cable pair numbers 0-99 service five serving terminals 16, 18, 20, 22, and 24 while BBox 14 and distribution cable 38b including cable pair numbers 100-224 service six serving terminals 26, 28, 30, 32, 34, and 36. The remaining 575 cable pairs continue along in the direction of arrow 41 to create additional loops within telephone network 10.

Serving terminals 16, 18, 20, 22, 24, 26, 28, 30, 32, 34, and 36 are small boxes positioned along the street every few houses with typically six to twenty-five cable pairs terminated at each serving terminal. The six to twenty-five cable pairs are allocated to the five or six residences in the serving terminal's vicinity on an as needed basis. For instance, distribution cable 38a terminates cable pairs at serving terminal 24 that service residences in the vicinity of Yale and Beanna, while distribution cable 38b terminates cable pairs at serving terminal 36 that service residences in the vicinity of Maple and Congress. In addition, each serving terminal 16, 18, 20, 22, 24, 26, 28, 30, 32, 34, and 36 has a serving terminal address which is a physical address where the serving terminal resides. The serving terminal address includes a number and a street name. For instance, serving terminal 18 may have a serving terminal address of 2529 Main, serving terminal 20 may have a serving terminal address of 2775 Main, and serving terminal 26 may have a serving terminal address of 810 Olive. Furthermore, each serving terminal 16, 18, 20, 22, 24, 26, 28, 30, 32, 34, and 36 is defined within the LFACS database by the serving terminal address.

The outside plant construction principles of constructing distribution cable 38 in binder groups of cable pairs and terminating a specified number of cable pairs at each serving terminal allows for serving terminals served by a single cable to have similar distribution segment characteristics such as length of cable from wire center 12 to the serving terminals and the gauge of the cable. For instance, all the cable pairs terminated at serving terminal 20 should be the same distance from wire center 12 and be of similar gauge since the cable pairs from feeder cable 37 and the cable pairs of distribution cable 38 terminated at serving terminal 24 should all be of approximately the same distance from wire center 12 and of similar gauge. In addition, the cable pairs at serving terminals 20 and 24 should be of similar distance from wire center 12 since serving terminals 20 and 24 are located relatively close to each other and of similar gauge since the cable pairs are from the same distribution cable 38. Furthermore, the cable pairs tend to remain aggregated in their binder groups such that the cable pairs making up loop 11 are likely to be the same distance from wire center 12 and of the same gauge as the other 99-pairs in distribution cable 38a's 100-pair binder group.

Figure 2:
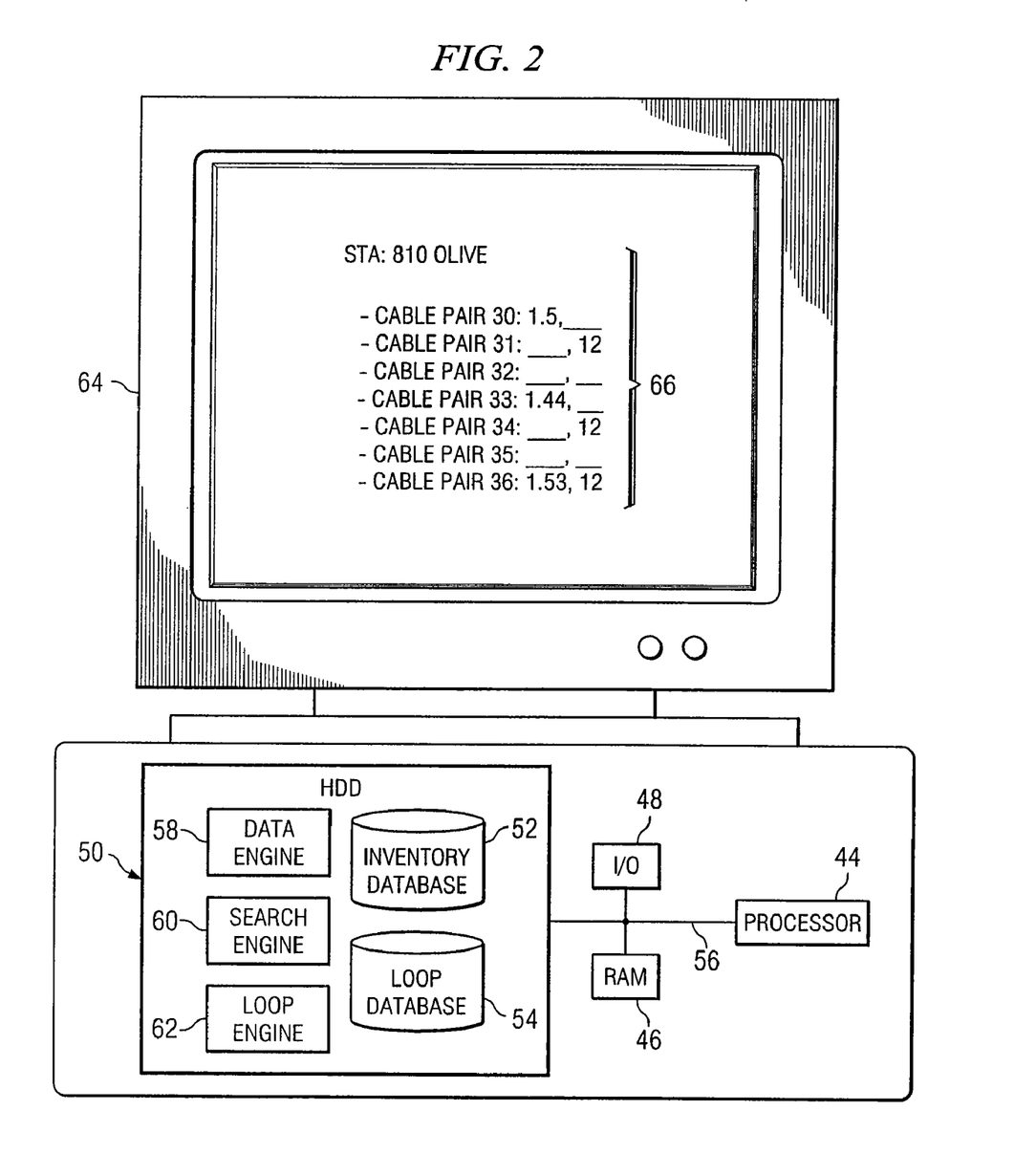
FIG. 2 illustrates a block diagram of an example system for imputing missing data.

Referring now to FIG. 2, a block diagram depicts imputing system 42 for imputing missing data into a database. In the example embodiment, imputing system 42 may include respective software components and hardware components, such as processor 44, memory 46, input/output ports 48, hard disk drive (HDD) 50 containing inventory database 52 and loop database 54, and those components may work together via bus 56 to provide the desired functionality. The various hardware and software components may also be referred to as processing resources. Imputing system 42 may be a personal computer, a server, or any other appropriate computing device and located at wire center 12, at a central office, a location remote from wire center 12, or any other appropriate location. Imputing system 42 also includes data engine 58, search engine 60, and loop engine 62, which reside in memory such as HDD 50 and are executable by processor 44 through bus 56.

In the embodiment shown in FIG. 2, imputing system 42 includes inventory database 52 and loop database 54. Inventory database 52 includes a plurality of feeder records and distribution records for all the cable pairs which are spliced together to form telephone network 10. Each feeder record includes information regarding the distance and gauge from wire center 12 to BBox 14 as well as distribution records which include information regarding the distance and gauge from the BBox to the serving terminal where the distribution cable pair terminates, including the distance from wire center 12 to the terminating serving terminal. Inventory database 52 is indexed and searchable by serving terminal address. For instance, a user may desire the distribution records for the cable pairs terminating at serving terminal 20. Therefore, the user searches 2775 Main, the serving terminal address for serving terminal 20, in inventory database 52 and the search returns the distribution records for the cable pairs terminating at serving terminal 20. But the distribution records may be incomplete and not include distance or gauge information, include distance but no gauge information, or include gauge but no distance information. In addition, inventory database 52 may also be referred to as the LFACS database.

Loop database 54 includes information regarding what cable pairs are associated with what cable numbers and which serving terminals 16, 18, 20, 22, 24, 26, 28, 30, 32, 34, and 36 the cable pairs terminate. For instance, a search of loop database for cable pair number 30 reveals that cable pair number 30 is part of cable number 03041 and terminates at serving terminal 26. In alternate embodiments, imputing system 42 may include more than two or less than two databases.

Imputing system 42 may further include display 64 for presenting graphical user interface (GUI) 66 and input devices such as a mouse and a keyboard. Display 64 presents GUI 66, which allows for a user to view the information stored in inventory database 52 and loop database 54. Shown in FIG. 2 is an example GUI 66 from inventory database 52 showing the distribution records for the cable pairs terminating at serving terminal 26.

Figure 3A:
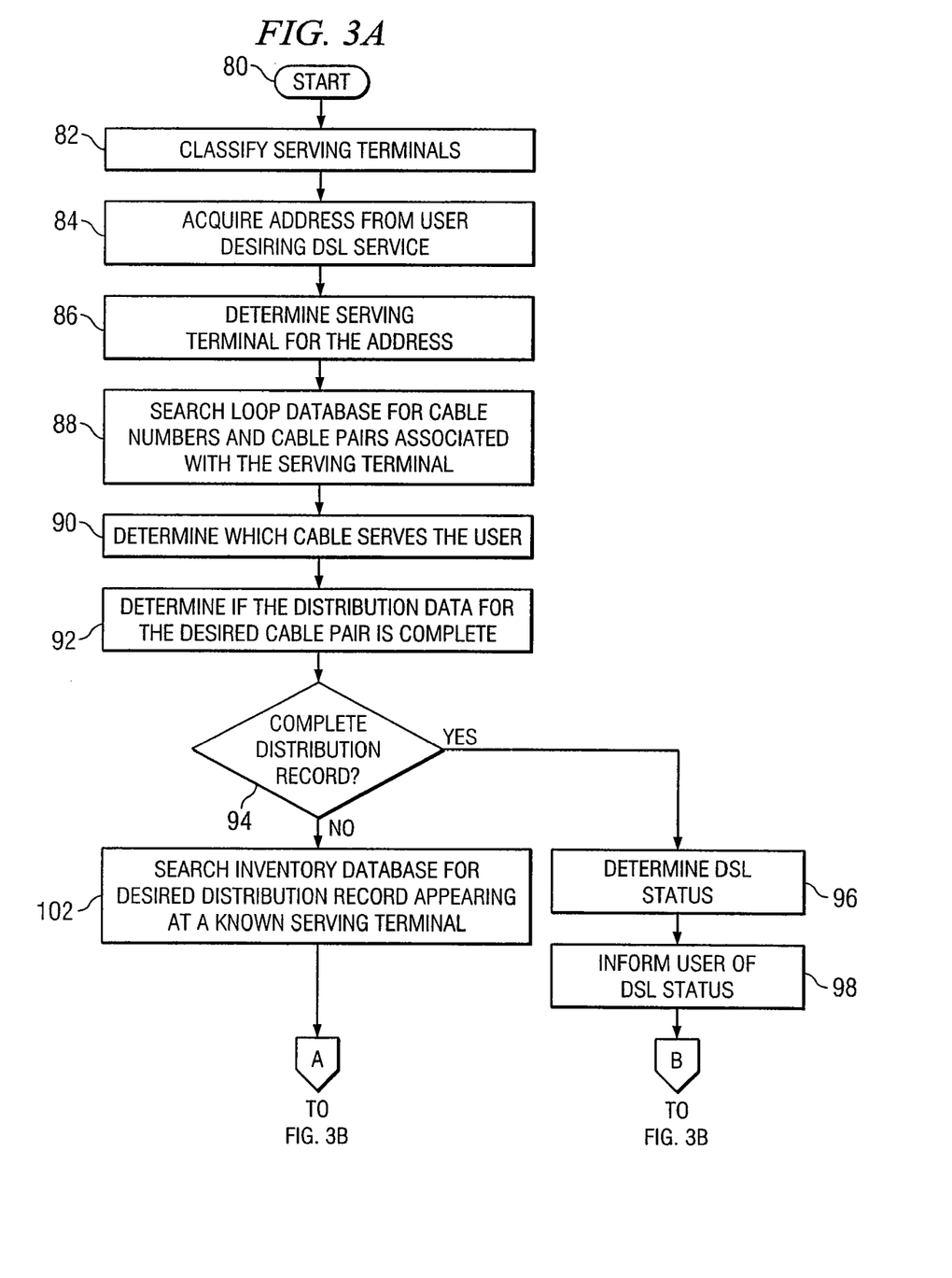
FIG. 3 depicts a flow diagram of an example embodiment of a method for imputing missing data.
Figure 3B:
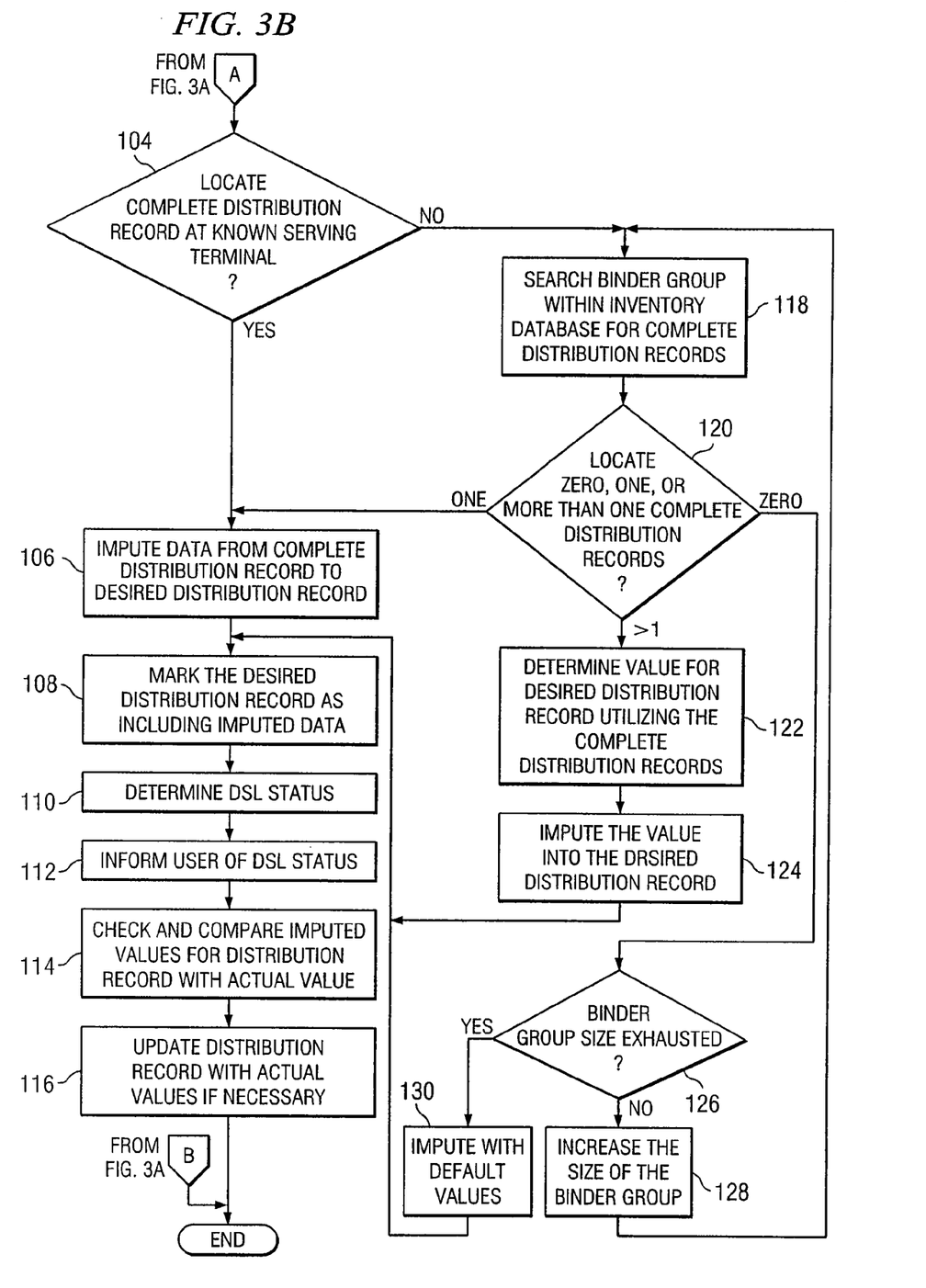

FIG. 3 illustrates a flow diagram of one embodiment of a method for imputing missing data into inventory database 52. The method begins at step 80 and at step 82 data engine 58 classifies serving terminals 16-36 into a known class or an unknown class based on the distribution records for each of the serving terminals. The known class of serving terminals includes serving terminals for which every distribution record for the cable pairs terminated at the serving terminal is known and therefore includes both the distance number and the gauge number. The unknown class of serving terminals includes the serving terminals where at least one of the cable pairs terminating at the serving terminal has a distribution record that includes missing data. For example, serving terminal 26 is classified in the unknown class because the distribution records for the cable pairs terminating at serving terminal 26 include missing data as shown by GUI 66 in FIG. 2.

Once serving terminals 16-36 have been classified, at step 84 the address is acquired from the user who is desiring DSL service and at step 86 data engine 58 determines the corresponding serving terminal and serving terminal address for the user requesting DSL service. For instance, a residential customer may call the telephone company to request DSL service. A customer service representative or an automated system such as an interactive voice response unit queries the customer for the address for which the customer is requesting DSL service. When the customer provides the address, data engine 58 determines which serving terminal serves the location for which the customer is requesting DSL service. For example, if the customer is a residential customer living at 2802 Main and requesting home DSL, then data engine 58 determines that serving terminal 20 serves the customer based on the customer's address. When data engine 58 determines which serving terminal serves the requesting address, at step 88 search engine 60 searches loop database 54 for the cable and cable pairs that terminate at the desired serving terminal and at step 90 determines which of the cable pairs that terminate at serving terminal 20 serve the customer.

When imputing system 42 determines the cable pairs serving the customer requesting DSL service, data engine 58 examines inventory database 52 in order to determine if the distribution record for the desired cable pair includes any missing data. Because inventory database 52 is indexed by serving terminal, data engine 58 examines inventory database 52 for the desired serving terminal serving the customer. Once the desired serving terminal is located, data engine 58 locates the desired distribution record for the desired cable pair serving the customer in order to determine if the distribution record includes both a distance value and a gauge value. For instance, data engine 58 examines inventory database 52 for serving terminal 20 in order to locate the distribution record for the desired cable pair serving the customer requesting DSL service. Once data engine 58 locates the desired cable pair and the associated desired distribution record, at step 94 data engine 58 determines if the desired distribution record is a complete distribution record or if it includes missing data.

If at step 94 the desired distribution record for the desired cable pair is a complete distribution record including both the distance value and the gauge value, then at step 96 imputing system 42 determines if the customer qualifies for DSL service based on the complete distribution record. If the distance and gauge values satisfy the required parameters for DSL service, then the customer is eligible for DSL service. But if either the distance value or the gauge value exceeds the required values for DSL service, then the customer does not qualify for DSL service. At step 98 the customer is informed as to whether or not they are eligible for DSL based on the distribution record and the method ends.

If at step 94 the desired distribution record is incomplete and therefore does not include the distance value, the gauge value, or both of these values, then at step 102 search engine 60 searches the known class of serving terminals 16-36 to determine if the desired cable pair makes an appearance at one of the serving terminals in the known class. Even though the desired cable pair has an incomplete distribution record at the serving terminal at which it terminates, the associated serving terminal, the desired cable pair may make an appearance at another serving terminal at which it does not terminate and therefore is not associated with. For example, a cable pair that terminates at serving terminal 30 passes through serving terminal 28 before terminating at serving terminal 30. Serving terminal 28 may include the distribution record for the cable pair terminating at serving terminal 30. If serving terminal 28 is classified in the known class, then when search engine 60 searches the known class for the desired cable pair, search engine 60 will locate a complete distribution record for the desired cable pair at serving terminal 28. Because the distance between serving terminals 28 and 30 is not excessive and the gauge is unlikely to change between serving terminals 28 and 30, the distribution record for the desired cable pair located at the serving terminal in the known class is an accurate representation for the distribution record for the desired cable pair terminating at serving terminal 30.

If at step 104 search engine 60 locates a complete distribution record for the desired cable pair at an unassociated serving terminal in the known class, then loop engine 62 imputes the complete distribution record from the unassociated serving terminal in the known class to the desired distribution record for the desired cable pair at step 106. Once loop engine 62 imputes the values into the desired distribution record, at step 108 loop engine 62 marks the desired distribution record including the imputed data in inventory database 52 as including imputed data and not actual data. Such marking may consist of an asterisk by the distribution record in inventory database 52, a keycode indicating if the data is actual or imputed and the method used to impute the data, checking a column for imputed data, or any other appropriate way of marking the data as imputed.

After the desired distribution record has been marked as including imputed data, the process continues to step 110 where imputing system 42 determines if the customer qualifies for DSL service based on the imputed distribution record. If the imputed distance and/or gauge values are within the required parameters for DSL service, then the customer is eligible for DSL service. But if either of the imputed values for the desired distribution record are outside of the required parameters for DSL service, then the customer does not qualify for DSL service. At step 112 the customer is informed as to whether or not they are eligible for DSL based on the desired distribution record including imputed data. Loop engine 62 then compares the imputed values in the desired distribution record in inventory database 52 with the actual value at step 114. The actual values for the desired distribution record may be obtained at a time later than when the imputed distribution values are determined.

The actual values for distance and gauge may be determined and/or verified utilizing physical measurement. For instance, when a service technician goes to the customer to install DSL service, the service technician checks for the actual values at the serving terminal and reports those values back to imputing system 42 for comparison. Alternately, the telephone company can perform an Adept Test or a MLT to determine the actual values for the distribution record after imputing system 42 has already determined that the customer qualifies for DSL service. Once the actual distribution record values are acquired for the desired cable pair and compared with the imputed distribution record, at step 116 loop engine 62 updates inventory database 52 with the actual values if the imputed values for the desired distribution record differ from the actual values. In addition, once the actual values for the desired distribution record are determined and entered into inventory database 52, loop engine 62 removes any markings from the desired distribution record indicating that it includes imputed data and the method ends.

If at step 104 search engine 60 does not locate the desired cable pair in the known class of serving terminals, then at step 118 search engine 60 searches a sized binder group within inventory database 52 for one or more complete distribution records. As described above, the cable and cable pairs are laid out in telephone network 10 and loops 11 and 13 in binder group pairs where cable pairs in the same binder group are likely to have similar values in the distribution records. The size of the binder group searched by search engine 60 at step 118 depends on how many times search engine 60 has searched binder groups within inventory database 52 for the desired distribution record. When search engine 60 has not searched any binder groups within inventory database 52, then search engine 60 begins by searching a 10-pair binder group. For instance, the desired cable pair is cable pair number 102 that terminates at serving terminal 20. When search engine 60 first searches a sized binder group, here a 10-pair binder group, search engine 60 searches cable pair numbers 101 through 110 for one or more complete distribution records corresponding to cable pair numbers 101 through 110. Such searching of binder groups is based on the outside plant construction principles that cable pairs in the same binder groups generally exhibit similar values for distance and gauge.

If at step 120 search engine 60 locates one complete distribution record within the sized binder group searched within inventory database 52, then at step 106 loop engine 62 imputes the data from the complete distribution into the desired distribution record. For instance, if the desired cable pair is cable pair number 32 terminating at serving terminal 26, a search of the 10-pair binder group of cable pair numbers 31 through 40 returns one complete distribution record corresponding to cable pair number 36 having a distance of 1.53 kft and a gauge of 12. Therefore, loop engine 62 imputes 1.53 kft and AWG 12 as the values for the distribution record for cable pair number 32. Once loop engine 60 imputes the values from the complete distribution record to the desired distribution record, step 108 through step 116 are repeated as described above and the method ends.

If at step 120 the search of the sized binder group returns more than one complete distribution record, then at step 122 loop engine 62 determines the imputed value for the desired distribution record based on the analysis of the located complete distribution records. Loop engine 62 may utilize statistical analysis in order to determine the imputed values for the desired distribution record when more than one complete distribution record is located within the sized binder group. For example, a search of a 10-pair binder group may return four complete distribution records. In order to determine the values to impute to the desired distribution record using the four complete distribution records, loop engine 62 may take a pure average value for length and gauge to impute to the desired distribution record, take the median of the four complete distribution records as the imputed value, the $75^{th}$ percentile as the imputed value, the $90^{th}$ percentile as the imputed value, or any other appropriate statistical analysis to determine a value for the desired distribution record when there are one or more complete distribution records in the sized binder group. Once loop engine 62 has determined the values to impute into the desired distribution record utilizing the complete distribution records, at step 124 loop engine 62 imputes those values into the desired distribution record. The process then continues to step 108 where step 108 through step 116 are repeated as described above and the method ends.

If at step 120 search engine 60 locates no complete distribution records within the sized binder group, then at step 126 search engine 60 determines if the binder group can be increased and therefore searched again. If the binder group size is not exhausted and can be increased, then at step 128 search engine 60 increases the size of the binder group size searched and then searches the increased binder group size within inventory database 52 at step 118. For instance, if search engine 60 searched a 10-pair binder group at step 118 and did not locate any complete distribution records, then at step 128 search engine 60 may increase the size of the binder group to a 25-pair binder group and search the 25-pair binder group at step 118 for any complete distribution records. For example, if cable pair numbers 51 through 60 were searched where the desired cable pair number is cable pair number 63 and no complete distribution records were located, then search engine 60 increases the binder group size to a 25-pair binder group and searches cable pair numbers 50 through 75 for one or more complete distribution records.

Steps 118, 120, 126, and 128 are repeated with an increasing binder group size being searched until either search engine 60 locates one or more complete distribution records at step 120 or until the binder group size is exhausted at step 126. If no complete distribution records are located in the 25-pair binder group, the binder group increases to a 50-pair binder group, then to a 75-pair binder, a 100-pair binder group, and so forth in 25-pair increments until either a complete distribution record is located or the binder group size is exhausted. If the binder group size is exhausted at step 126 without search engine 60 locating one complete distribution record, then at step 130 loop engine 62 imputes into the desired distribution record a default value and step 108 through step 116 are repeated as described above. The default value may be the longest designed loop and smallest gauge value in the known class of serving terminals and cable pairs.

In alternate embodiments, the binder group size that search engine 60 initially searches at step 118 can be of any size and does not have to be a 10-pair binder group. For instance, search engine 60 may first start searching a 25-pair binder group. And the increase in the size of the binder group searched when search engine 60 locates no complete distribution records can be any interval desired by the operator of imputing system 42 such as 5-pair 10-pair, 20-pair, 25-pair, 50-pair, 100-pair, or any other appropriate binder group size interval.

The method described in FIG. 3 allows for the estimation of distribution record values of distance and gauge given the layout of telephone network 10. An alternate serving terminal or the smallest binder group to which the desired cable pair belongs allows for the best estimation for cable pairs having incomplete distribution records. This eliminates the bias towards higher loop lengths except for the instances where one complete distribution record cannot be located before the binder group is exhausted.

Although the present invention has been described in detail with respect to DSL and the LFACS database, it should be understood that the data imputing system and method exploiting the statistical properties of data can be utilized with any database that contains data that can be organized in a hierarchical fashion allowing for the improvement in the completeness and accuracy of the data. Furthermore, the imputing method can be applied to any database wherein a set of rules allows for an inference of relationships between known and missing data in the same dataset. For instance, this methodology can be utilized to improve the completeness and accuracy of other databases such as LEIS, LEAD, PREMIS, and TIRKS.

In addition, one of ordinary skill will appreciate that alternative embodiments can be deployed with many variations in the number and type of devices in the system, the communication protocols, the system topology, the distribution of various software and data components among the hardware systems in the network, and myriad other details without departing from the present invention.

It should also be noted that the hardware and software components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein. In alternative embodiments, systems incorporating the invention may include personal computers, mini computers, mainframe computers, distributed computing systems, and other suitable devices.

Alternative embodiments of the invention also include computer-usable media encoding logic such as computer instructions for performing the operations of the invention. Such computer-usable media may include, without limitation, storage media such as floppy disks, hard disks, CD-ROMs, DVD-ROMs, read-only memory, and random access memory; as well as communications media such as wires, optical fibers, microwaves, radio waves, and other electromagnetic or optical carriers.

Although the present invention has been described in detail, it should be understood that various changes, substitutions and alterations can be made hereto without departing from the spirit and scope of the invention as defined by the appended claims.

What is claimed is:

1. A method for loop qualification for DSL services, the method comprising:
   locating a particular serving terminal associated with a user requesting the DSL service, wherein the particular serving terminal is associated with a cable number and a particular cable pair;
   determining the cable number and the particular cable pair associated with the particular serving terminal;
   locating a particular distribution record, the particular distribution record associated with the particular cable pair;
   determining if the particular distribution record includes missing data;
   searching records for the serving terminals in a known class for a complete distribution record associated with the particular cable pair;
   determining a value for the missing data for the particular distribution record and the particular cable pair based on the searching of the serving terminals;
   imputing the value into the particular distribution record for the particular cable pair; and indicating that the particular distribution record includes the imputed value.

2. A method for imputing data into a database, the method comprising:

determining if a particular distribution record associated with a particular cable pair is missing data, the particular cable pair being associated with a particular serving terminal;

searching records of one or more serving terminals not associated with the particular cable pair for a complete distribution record associated with the particular cable pair; and determining an imputed value for the data missing from the distribution record associated with the particular cable pair based on the searching of the serving terminals.

3. The method of claim 2 further comprising imputing the imputed value for the missing data into the distribution record associated with the particular cable pair.

4. The method of claim 3 further comprising imputing into the distribution record for the particular cable pair the complete distribution record located when searching the serving terminals.

5. The method of claim 2, further comprising indicating when the distribution records include imputed values instead of one or more actual values.

6. The method of claim 2, further comprising determining a serving terminal associated with a user requesting a broadband Internet service.

7. The method of claim 2, further comprising imputing one or more default values for data missing from the distribution record associated with the particular cable pair when the searching of the one or more serving terminals.

8. The method of claim 2, further comprising comparing the imputed value for the distribution record for the particular cable pair with an actual value for the distribution record for the particular cable pair.

9. The method of claim 8 further comprising replacing the imputed value with the actual value when the imputed value and the actual value are not the same.

10. A system for imputing missing data into a database, the system comprising:

an inventory database including a plurality of distribution records each associated with one of a plurality of cable pairs;

a data engine associated with the inventory database, the data engine operable to determine if a particular distribution record associated with a particular cable pair is missing data;

a search engine associated with the data engine, the search engine operable to iteratively search records of a binder group within the inventory database for one or more complete distribution records; and a loop engine associated with the search engine, the loop engine operable to:

determine a value for the particular distribution record based on the searching and impute the value into the particular distribution record.

11. The system of claim 10, further comprising a loop database associated with the inventory database, the loop database including a plurality of cable numbers and the cable pairs associated with a plurality of serving terminals.

12. The system of claim 11, wherein the search engine is further operable to search the loop database for the cable number and cable pairs associated with a particular serving terminal.

13. The system of claim 10, further comprising the loop engine operable to mark the particular distribution record including the imputed value with an indication.

14. The system of claim 10, further comprising the loop engine operable to compare the imputed value for the particular distribution record with an actual value for the particular distribution record.

15. The system of claim 14, further comprising the loop engine operable to replace the imputed value with the actual value when the imputed value and the actual value are not the same.

16. The system of claim 10, further comprising the loop engine operable to impute a default value into the particular distribution record when the search of the inventory database returns no complete distribution records.

17. The system of claim 10, wherein the loop engine determines the value for the particular distribution record by performing statistical analysis on the one or more complete distribution records located in the inventory database.

18. A non-transitory computer program product, comprising computer executable instructions stored on a computer readable medium, for determining a value for missing data in a database, wherein the database includes distribution records associated with twisted cable pairs, the distribution records including complete distribution records and incomplete distribution records, wherein a complete distribution record includes information indicative of a length and a wire gauge of the associated cable pair, the computer program product comprising:

instructions for determining if a particular distribution record associated with a particular cable pair is an incomplete distribution record;

instructions for identifying a particular complete distribution record wherein the particular complete distribution record and the particular distribution record correspond to the same twisted cable pair or correspond to respective cable pairs that share a common binder group; and instructions for imputing a wire gauge and length in the particular complete distribution record to the incomplete distribution record.

19. The computer program product of claim 18, wherein the complete distribution record is associated with a first serving terminal and the second distribution record is associated with a second serving terminal.

20. The computer program product of claim 19, wherein the particular distribution record corresponds to a cable pair terminating at the first serving terminal and further wherein the second serving terminal comprises a known serving terminal wherein all distribution records associated with the second terminal comprise complete distribution records.

* * * * *